United States Patent
Li et al.

(10) Patent No.: US 12,292,295 B2
(45) Date of Patent: May 6, 2025

(54) ROUTE PLANNING AND NAVIGATION METHOD AND APPARATUS

(71) Applicant: Amap Software Co., Ltd., Beijing (CN)

(72) Inventors: Bo Li, Beijing (CN); Fan Yang, Beijing (CN); Song Zhang, Beijing (CN); Ming Zhao, Beijing (CN)

(73) Assignee: AMAP SOFTWARE CO., LTD., Beijing (CN)

( * ) Notice: Subject to any disclaimer, the term of this patent is extended or adjusted under 35 U.S.C. 154(b) by 416 days.

(21) Appl. No.: 17/947,615

(22) Filed: Sep. 19, 2022

(65) Prior Publication Data
US 2023/0095669 A1 Mar. 30, 2023

(30) Foreign Application Priority Data
Sep. 27, 2021 (CN) .......................... 202111134530.1

(51) Int. Cl.
*H04W 4/024* (2018.01)
*G01C 21/34* (2006.01)

(52) U.S. Cl.
CPC ......... *G01C 21/3461* (2013.01); *H04W 4/024* (2018.02)

(58) Field of Classification Search
CPC .......................... G01C 21/3461; H04W 4/024
See application file for complete search history.

(56) References Cited

U.S. PATENT DOCUMENTS

| | | | |
|---|---|---|---|
| 5,519,619 A | 5/1996 | Seda | |
| 5,610,821 A | 3/1997 | Gazis et al. | |
| 7,349,768 B2 | 3/2008 | Bruce et al. | |
| 7,778,773 B2 | 8/2010 | Yaqub et al. | |
| 7,840,319 B2 | 11/2010 | Zhong | |
| 8,121,749 B1 | 2/2012 | Agrawal et al. | |

(Continued)

FOREIGN PATENT DOCUMENTS

| | | |
|---|---|---|
| CN | 101765229 A | 6/2010 |
| CN | 102023019 A | 4/2011 |

(Continued)

OTHER PUBLICATIONS

Supplementary Search Report for Chinese Application No. 202111134530.1 mailed on Nov. 30, 2023.

(Continued)

*Primary Examiner* — Aryan E Weisenfeld
*Assistant Examiner* — Jeffrey R Chalhoub
(74) *Attorney, Agent, or Firm* — Sheppard Mullin Richter & Hampton LLP

(57) ABSTRACT

Embodiments of this application disclose a route planning method and apparatus. The method includes obtaining request failure information in response to detecting a route planning request failure event, obtaining a failure event occurrence time, and generating a request failure log based on the request failure information and the failure event occurrence time, and sending the request failure log to a cloud, to cause an application deployed in the cloud to perform signal blind area marking on a road for route planning based on the request failure log. The technical solutions can identify a road in a signal blind area, to provide a planned route with covered communication and a more stable positioning network.

16 Claims, 2 Drawing Sheets

---

S101 — Obtain request failure information in response to detecting a route planning request failure event S102 — Obtain a failure event occurrence time, and generate a request failure log based on the request failure information and the failure event occurrence time S103 — Send the request failure log to a cloud, to cause a service deployed in the cloud to perform signal blind area marking on a road for route planning based on the request failure log

(56) References Cited

U.S. PATENT DOCUMENTS

| | | |
|---|---|---|
| 8,560,227 B2 | 10/2013 | Feng |
| 8,612,140 B2 | 12/2013 | Gutman |
| 8,751,077 B2 | 6/2014 | Hiruta et al. |
| 9,261,374 B2 | 2/2016 | Mundinger et al. |
| 9,291,469 B2 | 3/2016 | Hoch et al. |
| 9,810,543 B2 | 11/2017 | Hoch et al. |
| 9,816,832 B2 | 11/2017 | Hsu |
| 10,451,428 B2 | 10/2019 | Lathrop et al. |
| 10,724,870 B2 | 7/2020 | Adam et al. |
| 10,787,315 B2 | 9/2020 | Hance et al. |
| 2006/0161337 A1 | 7/2006 | Ng |
| 2007/0271034 A1 | 11/2007 | Perry |
| 2012/0209522 A1 | 8/2012 | Gollnick |
| 2013/0197797 A1 | 8/2013 | Boddy et al. |
| 2014/0257695 A1 | 9/2014 | Annapureddy et al. |
| 2015/0253144 A1 | 9/2015 | Rau et al. |
| 2015/0268052 A1 | 9/2015 | Bérczi et al. |
| 2017/0026929 A1 | 1/2017 | Grischy et al. |
| 2017/0356747 A1 | 12/2017 | Iagnemma |
| 2019/0293441 A1 | 9/2019 | Melnikov et al. |
| 2019/0376807 A1 | 12/2019 | Iagnemma |
| 2020/0208998 A1 * | 7/2020 | Xiang ................... G06F 16/29 |
| 2020/0209001 A1 | 7/2020 | Demerly et al. |

FOREIGN PATENT DOCUMENTS

| | | | | |
|---|---|---|---|---|
| CN | 106992902 A | | 7/2017 | |
| CN | 109655832 A | | 4/2019 | |
| CN | 112449310 A | * | 3/2021 | ............ H04W 24/02 |
| KR | 102097579 B1 | * | 4/2020 | |
| WO | 2007071864 A1 | | 6/2007 | |
| WO | 2017100473 A1 | | 6/2017 | |
| WO | 2021029869 A1 | | 2/2021 | |

OTHER PUBLICATIONS

Guo, "Optimization of Railway Digital Mobile Communications GSM-R Wireless Network," Computer Knowledge and Technology, vol. 11, No. 25, Sep. 2015, machine translation of abstract provided.

Li et al., "A Two-Step Adaptive Blind Source Sepration for Machine Sound," 2006 6th World Congress on Intelligent Control and Automation, Oct. 23, 2006.

First Search Report for Chinese Application No. 202111134530.1 mailed on May 26, 2023.

* cited by examiner

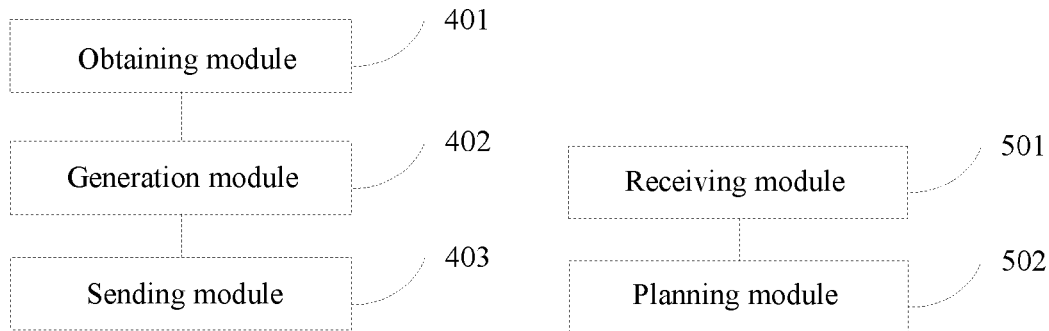
FIG. 4
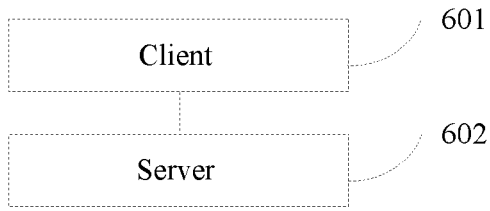
FIG. 5
FIG. 6
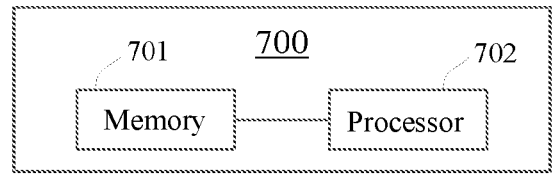
FIG. 7
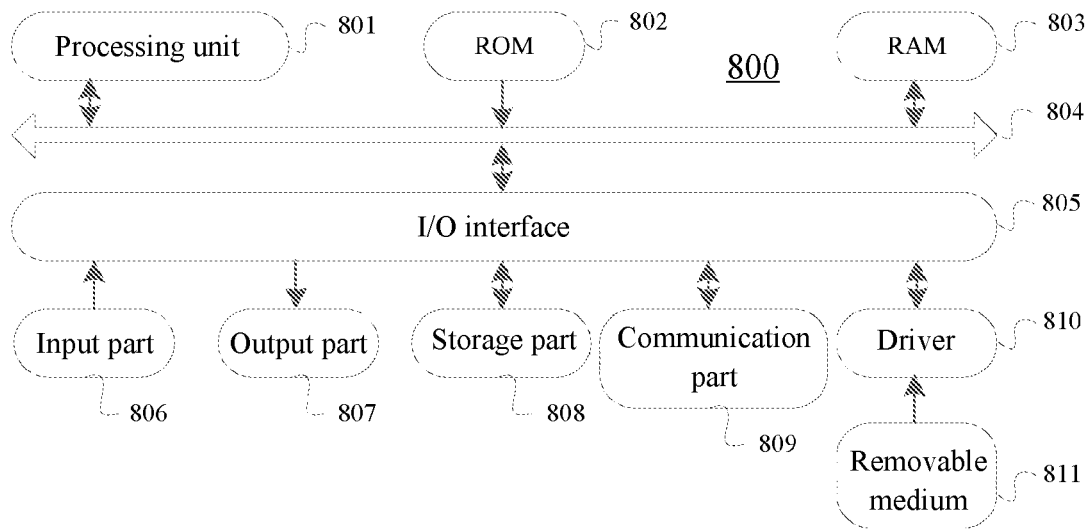
FIG. 8

ROUTE PLANNING AND NAVIGATION METHOD AND APPARATUS

CROSS-REFERENCE TO RELATED APPLICATION

This application is based on and claims priority to and benefits of Chinese Patent Application No. 202111134530.1, filed with the China National Intellectual Property Administration (CNIPA) on Sep. 27, 2021. The entire content of the above-identified application is incorporated herein by reference.

TECHNICAL FIELD

Embodiments of this application relates to the field of navigation technologies, and specifically, to route planning and navigation methods and apparatus.

BACKGROUND

With the development and progress of society, there are more and more vehicles on roads, and many users use application software to provide navigation, obtain navigation routes and travel along the navigation routes. When application software provides a navigation service, the application software needs to perform data interaction with a cloud through a network, and a terminal device on which the application software is installed needs to be always connected to the network in some scenarios. This brings new challenges and requirements for navigation route planning.

SUMMARY

Embodiments of this application provide route planning methods and apparatus.

According to one aspect, an embodiment of this application provides a route planning method. According to one embodiment, the route planning method includes: obtaining request failure information in response to detecting a route planning request failure event; obtaining a failure event occurrence time, and generating a request failure log based on the request failure information and the failure event occurrence time; and sending the request failure log to a cloud, to cause an application deployed in the cloud to perform signal blind area marking on a road for route planning based on the request failure log.

According to another embodiment, the method may further include: if the route planning request failure event includes a network usage request failure event, the request failure information includes one or more of the following information: a road identifier, request failure location information, or a network operator identifier; if the route planning request failure event includes a positioning request failure event, the request failure information includes one or more of the following information: a road identifier, request failure location information, or a positioning service provider identifier.

According to another aspect, an embodiment of this application provides a route planning method, including receiving a route planning request; and planning, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

According to another embodiment, the method may further include: determining, based on a device identifier carried in the request, whether a policy of avoiding signal blind areas during route planning is valid; and performing, if the policy is valid, the step of planning, based on start and end point information and road network data carried in the request, a navigation route that at least avoids signal blind areas.

According to a further embodiment, the method further includes performing, based on a request failure log received in a set time period, signal blind area marking on a road for route planning.

In some embodiments, the request failure log includes request failure information, the request failure information includes: a road identifier, request failure location information, and a network operator identifier and/or a positioning service provider identifier, and the performing, based on a request failure log received in a set time period, signal blind area marking on a road for route planning includes: extracting the road identifier from the request failure log; and performing, by using the road identifier as an index, signal blind area marking on the road for route planning according to the request failure location information, and the network operator identifier and/or the positioning service provider identifier recorded in the request failure log.

In one aspect, the request failure log may further include a request failure log sending time, and the performing, by using the road identifier as an index, signal blind area marking on the road for route planning according to the request failure location information, and the network operator identifier and/or the positioning service provider identifier recorded in the request failure log may include: determining, by using the road identifier as the index, a quantity of first objects passing through a target road corresponding to the road identifier in a preset historical time period; determining, based on the request failure log sending time, a quantity of second objects passing through the road and sending the request failure log in the preset historical time period; determining a network communication evaluation value and/or a network positioning evaluation value of the target road according to a ratio of the quantity of the first objects to the quantity of the second objects; and marking a road whose network communication evaluation value and/or network positioning evaluation value are lower than a preset evaluation value as a signal blind area.

In another aspect, the request failure log may further include a request failure log sending time, and the performing, by using the road identifier as an index, signal blind area marking on the road for route planning according to the request failure location information, and the network operator identifier and/or the positioning service provider identifier recorded in the request failure log may include: determining, by using the road identifier as the index based on the request failure log sending time, a quantity of third objects passing through a target road corresponding to the road identifier and sending the request failure log in a preset historical time period; and marking the target road as a signal blind area in a case that the quantity of the third objects exceeds a preset quantity threshold.

According to some embodiments, the method may further include: using the network communication evaluation value and/or the network positioning evaluation value, the request failure location information, and the network operator identifier and/or the positioning service provider identifier of the road as additional mark information of the signal blind area.

According to some other embodiments, the method may further include: determining a geographic location area of a signal blind area based on coverage data of a network access device; obtaining, from the road network data, a road that falls in the geographic location area of the signal blind area; and setting a network communication evaluation value and/or a network positioning evaluation value of the road located in the geographic location area of the signal blind area as preset values, and performing signal blind area marking on a road for route planning according to the network communication evaluation value and/or the network positioning evaluation value.

According to a further aspect, an embodiment of this application provides a route planning method, which includes: obtaining, by a client, request failure information in response to detecting a route planning request failure event, obtaining a failure event occurrence time, generating a request failure log based on the request failure information and the failure event occurrence time, and sending the request failure log to a cloud; and receiving, by a server, a route planning request, and planning, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

An embodiment of this application provides a route planning apparatus, which may include an obtaining module, configured to obtain request failure information in response to detecting a route planning request failure event; a generation module, configured to obtain a failure event occurrence time, and generate a request failure log based on the request failure information and the failure event occurrence time; and a sending module, configured to send the request failure log to a cloud, to cause an application deployed in the cloud to perform signal blind area marking on a road for route planning based on the request failure log.

According to another embodiment of this application, a route planning apparatus may include a receiving module, configured to receive a route planning request; and a planning module, configured to plan, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

An embodiment of this application provides a route planning system, which may include a client, configured to obtain request failure information in response to detecting a route planning request failure event, obtain a failure event occurrence time, generate a request failure log based on the request failure information and the failure event occurrence time, and send the request failure log to a cloud; and a server, configured to receive a route planning request, and plan, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

Another embodiment of this application provides an electronic device, including: a memory and a processor, where the memory is configured to store one or more computer instructions for supporting a route planning apparatus to perform the above route planning method, and the processor is configured to execute the computer instructions stored in the memory. The route planning apparatus may further include a communication interface, configured to enable the route planning apparatus with another device or a communication network.

A further embodiment of this application provides a computer-readable storage medium, configured to store computer instructions used by a route planning apparatus, where the computer instructions include the computer instructions involved with the route planning apparatus when performing the above route planning method.

Another embodiment of this application provides a navigation method, including: obtaining a navigation route at least based on a start point, an end point, and route planning data, and performing navigation guidance based on the navigation route, where the route planning data is implemented based on the method according to any one of the above descriptions.

According to another aspect, an embodiment of this application provides a non-transitory computer-readable storage medium storing instructions that, when executed by one or more processors, cause the one or more processors to perform operations including receiving a route planning request, and planning, based on start and end point information and road network data carried in the request, a navigation route that avoids signal blind areas. The signal blind area marking may be pre-performed on roads in the road network data, and the navigation route does not include roads marked with signal blind areas or lengths of roads marked with signal blind areas included in the navigation route are less than a preset length threshold.

The technical solutions provided in the embodiments of this application may include the following beneficial effects: based on reporting of a client for a route planning request failure log, an application deployed in a cloud can perform signal blind area marking on a road for route planning based on the request failure log. The technical solutions can identify a road in a signal blind area, to provide a planned route with covered communication and a more stable positioning network state, which meets the requirement that a terminal device needs to be always connected to a network during traveling in some scenarios.

It should be understood that the above general descriptions and the following detailed descriptions are merely for exemplary and explanatory purposes, and cannot limit the embodiments of this application.

BRIEF DESCRIPTION OF THE DRAWINGS

With reference to accompanying drawings, through the detailed description of non-limiting implementations, other features, objectives, and advantages of the embodiments of this application become more obvious. In the accompanying drawings:

FIG. 4 is a structural block diagram of a route planning apparatus according to an implementation of this application;

FIG. 5 is a structural block diagram of a route planning apparatus according to another implementation of this application;

FIG. 6 is a structural block diagram of a route planning system according to an implementation of this application;

FIG. 7 is a structural block diagram of an electronic device according to an implementation of this application; and FIG. 8 is a schematic structural diagram of a computer system adapted to implement a route planning method according to an implementation of this application.

DETAILED DESCRIPTION

In the following, exemplary implementations of the embodiments of this application will be described in detail with reference to the accompanying drawings so that a person skilled in the art can easily implement them. In addition, for the sake of clarity, parts not used for describing the exemplary implementations are omitted from the accompanying drawings.

In the embodiments of this application, it should be understood that terms such as "include" or "have" are intended to indicate the existence of the features, numbers, steps, behaviors, components, parts, or combinations thereof disclosed in the specification, but not to exclude the possibility that one or more other features, numbers, steps, behaviors, components, parts, or combinations thereof exist or are added.

In addition, it should be further noted that, the embodiments in this application and features in the embodiments may be mutually combined in case that there is no conflict. The embodiments of this application are described in detail below with reference to the accompanying drawings and the embodiments.

In the technical solutions provided by the embodiments of this application, based on reporting of a client for a route planning request failure log, an application deployed in a cloud can perform signal blind area marking on a road for route planning based on the request failure log. The technical solutions can identify a road in a signal blind area, to provide a planned route with covered communication and a more stable positioning network state, which meets the requirement that a terminal device needs to be always connected to a network during traveling in some scenarios.

Figure 1:
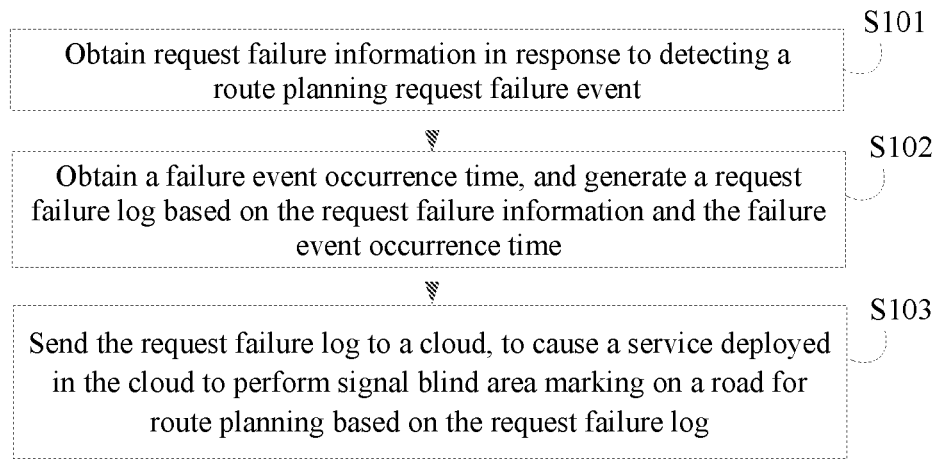
FIG. 1 is a flowchart of a route planning method according to an implementation of this application.

FIG. 1 is a flowchart of a route planning method according to an implementation of this application. As shown in FIG. 1, the route planning method includes the following steps S101 to S103.

In step S101, obtaining request failure information in response to detecting a route planning request failure event.

In step S102, obtaining a failure event occurrence time, and generating a request failure log based on the request failure information and the failure event occurrence time.

In step S103, sending the request failure log to a cloud, to cause an application deployed in the cloud to perform signal blind area marking on a road for route planning based on the request failure log.

As mentioned above, with the development and progress of society, there are more and more vehicles on roads, and many users use application software that supports a map navigation function, to obtain navigation routes and to help on travel along the navigation routes. When application software provides a navigation service, the application software needs to perform data interaction with a cloud through a network, and a terminal device on which the application software is installed needs to be always connected to the network in some scenarios, which also brings new challenges and requirements for navigation route planning.

In consideration of the above problems, in this implementation, a route planning method is provided. The method enables, based on reporting of a client for a route planning request failure log, an application deployed in a cloud to perform signal blind area marking on a road for route planning based on the request failure log. The technical solutions can identify a road in a signal blind area, to provide a planned route with covered communication and a more stable positioning network state, which meets the requirement that a terminal device needs to be always connected to a network during traveling in some scenarios.

In an implementation of this application, the route planning method is applicable to a client device such as a computer, a computing device, or an electronic device.

In an implementation of this application, the route planning request failure event refers to an event that a user or a client device sends a route planning request but the request fails. The route planning request failure event may include one or more of the following events: a network usage request failure event, or a positioning request failure event. The network usage request failure event refers to an event of requesting to use a network but failed, and the requesting to use a network may refer to, for example, requesting to use network data, requesting to connect the network, requesting to upload data to the network, or requesting to download data from the network. The positioning request failure event refers to an event of requesting location information but failed. The occurrence of the request failure event is caused to a large extent because a communication or positioning network does not cover a current area, a communication or positioning signal is too weak, or a base station or an operator that provides a communication network service or a service provider that provides a location information service fails.

In an implementation of this application, the request failure information refers to information related to the route planning request failure event for recording specific feature information of the corresponding route planning request failure event. For example, in a case that the route planning request failure event is the network usage request failure event, the request failure information may include one or more of the following information: a road identifier, request failure location information, or a network operator identifier. In a case that the route planning request failure event is the positioning request failure event, the request failure information may include one or more of the following information: a road identifier, request failure location information, or a positioning service provider identifier. The road identifier refers to information used for performing distinguishing identification on a road, and the road identifier may be, for example, a road ID. The request failure location information refers to location information of the client device when detecting the route planning request failure event, and the request failure location information may be, for example, longitude and latitude data of the client device when detecting the route planning request failure event. The network operator identifier refers to information used for performing distinguishing identification on a network operator, for example, identification information representing different network operators. The network operators may be different companies, for example, China Mobile, Unicom, and Telecom. The positioning service provider identifier refers to information used for performing distinguishing identification on a positioning service provider, for example, identification information representing different positioning service providers. The positioning service providers may be, for example, GPS, and Beidou.

In an implementation of this application, the failure event occurrence time refers to a time at which the route planning request failure event occurs. Because the client device generates and sends the request failure log after the route planning request failure event is detected, the failure event occurrence time may be also considered as a generating and sending time of the request failure log, and a server may subsequently perform corresponding marking on a road based on the time information.

In the above implementation, after the route planning request failure event is detected, the client device may obtain the request failure information which is related to the route planning request failure event and can characterize the specific feature information of the route planning request failure event; generate the request failure log based on the request failure information and the failure event occurrence time, for example, may encapsulate the request failure information and the failure event occurrence time based on a preset encapsulation protocol, to obtain the request failure log; and send the request failure log to the cloud, to cause the application deployed in the cloud to perform signal blind area marking on the road for route planning based on the request failure log, thereby providing a planned route with covered communication and a more stable positioning network state.

In an implementation of this application, step S103 of sending the request failure log to a cloud may include the following step: sending the request failure log to the cloud in response to detecting a network usage request success event.

As mentioned above, the client device may generate the corresponding request failure log when the route planning request failure occurs. Therefore, when the request failure log is sent to the cloud, the client device needs to be successfully connected to a network before sending, that is, after the network usage request success event is detected, the request failure log is sent to the cloud.

Figure 2:
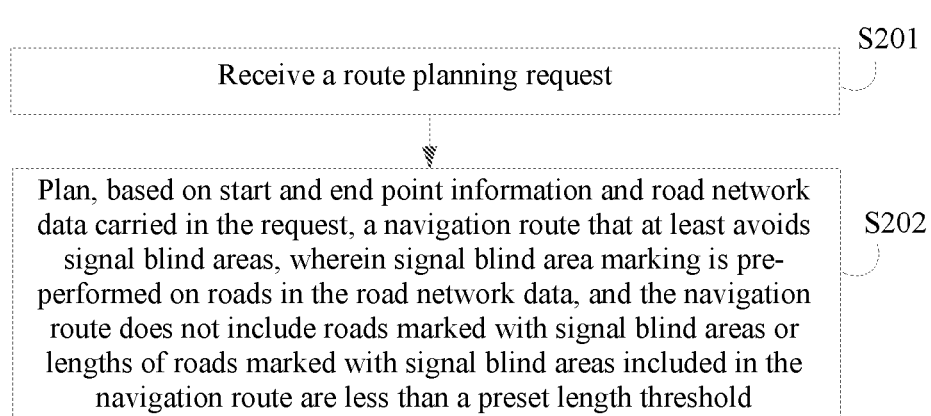
FIG. 2 is a flowchart of a route planning method according to another implementation of this application.

FIG. 2 is a flowchart of a route planning method according to another implementation of this application. As shown in FIG. 2, the route planning method includes the following steps S201 and S202.

In step S201, receiving a route planning request.

In step S202, planning, based on start and end point information and road network data carried in the request, a navigation route that at least avoids signal blind areas, where signal blind area marking is pre-performed on roads in the road network data, and the navigation route does not include roads marked with signal blind areas. In another embodiment, this step includes planning a navigation route, in which the lengths of roads marked with signal blind areas included in the navigation route are less than a preset length threshold.

As mentioned above, with the development and progress of society, there are more and more vehicles on roads, and many users use application software that supports a map navigation function, to obtain navigation routes and help on travel along the navigation routes. When application software provides a navigation service, the application software needs to perform data interaction with a cloud through a network, and a terminal device on which the application software is installed needs to be always connected to the network in some scenarios, which also brings new challenges and requirements for navigation route planning.

In consideration of the above problems, in this implementation, a route planning method is provided. The method performs navigation route planning by using road network data on which signal blind area marking is pre-performed and start and end point information carried in a route planning request. The technical solutions can identify a road in a signal blind area, to provide a planned route with covered communication and a more stable positioning network state, which meets the requirement that a terminal device needs to be always connected to a network during traveling in some scenarios.

In an implementation of this application, the route planning method is applicable to a server side device such as a computer, a computing device, an electronic device, a server, or a server cluster that can perform route planning.

In an implementation of this application, the route planning request refers to a request sent by a client for requesting to perform route planning, where the route planning request may carry the start and end point information of route planning.

In an implementation of this application, signal blind area marking is pre-performed on the roads in the road network data according to a request failure log, where the request failure log is sent by a client device, and may include request failure information and an occurrence time of a route planning request failure event. In one embodiment, the occurrence time of the route planning request failure event may include a sum of request failure log sending times. In a case that the route planning request failure event is a network usage request failure event, the request failure information may include one or more of the following information: a road identifier, request failure location information, or a network operator identifier. In a case that the route planning request failure event is a positioning request failure event, the request failure information may include one or more of the following information: a road identifier, request failure location information, or a positioning service provider identifier.

Route planning performed based on the road network data in which signal blind area marking is performed on the above roads does not include the roads marked with the signal blind areas. Or, in another embodiment, in the planned route, the lengths of the roads marked with the signal blind areas included in a generated navigation route are less than a preset length threshold, where the length threshold may be set according to requirements for an actual application. For example, the length threshold may be determined according to an impact of a road in a signal blind area on the overall travel of the navigation route.

In the above implementation, after a server side device receives the route planning request sent by the client device, the server side device may plan the navigation route according to the start and end point information carried in the route planning request and the road network data in which signal blind area marking is pre-performed on the roads, so that the navigation route can avoid the signal blind areas. For example, the navigation route does not include the roads marked with the signal blind areas, or the lengths of the roads marked with the signal blind areas included in the navigation route are less than the preset length threshold.

In an implementation of this application, the method further includes the following step: determining, based on a device identifier carried in the request, whether a policy of avoiding signal blind areas during route planning is valid;

and performing, if the policy is valid, the step of planning, based on start and end point information and road network data carried in the request, a navigation route that at least avoids signal blind areas.

In this implementation, the route planning request carries the device identifier, and the device identifier refers to information for the client device to perform distinguishing identification, such as a device ID or a device serial number. The device identifier may be used for identifying whether the client device needs the policy of avoiding the signal blind areas during route planning. For example, a set of client device identifiers that need the policy of avoiding the signal blind areas during route planning may be predetermined based on authorization of the client device. If the device identifier carried in the received route planning request is located in the set of client device identifiers, it may be considered that the client device determines to need the policy of avoiding the signal blind areas during route planning, that is, for the client device, the policy of avoiding the signal blind areas during route planning is valid. After it is determined that the policy of avoiding the signal blind areas during route planning is valid, the step of planning, based on start and end point information and road network data carried in the request, a navigation route that at least avoids signal blind areas is performed.

In an implementation of this application, the method further includes: performing, based on a request failure log received in a set time period, signal blind area marking on a road for route planning.

To avoid a road in a signal blind area during navigation route planning, in this implementation, signal blind area marking needs to be performed on the road for route planning based on the received request failure log. Further, considering that a greater computing pressure may be brought if a frequency of marking whether the road is in the signal blind area is too high, a processing manner of periodically collecting request failure logs, and periodically marking whether the road is in the signal blind area or periodically updating a road identifier may be used. That is, one time interval may be preset, such as one day or one week; received request failure logs are collected every time interval such as every day or every week, to obtain collected request failure logs; and signal blind area marking is performed on the road for route planning according to the collected request failure logs, that is, signal blind area marking is performed on the road for route planning based on the request failure logs received in the set time period. For example, if the time interval is set to one week, the set time period is one week before a current time.

As mentioned above, the request failure log may include request failure information, and the request failure information may include: a road identifier, request failure location information, and a network operator identifier and/or a positioning service provider identifier. Therefore, in an implementation of this application, the performing, based on a request failure log received in a set time period, signal blind area marking on a road for route planning may include the following steps:

extracting the road identifier from the request failure log; and performing, by using the road identifier as an index, signal blind area marking on the road for route planning according to the request failure location information, and the network operator identifier and/or the positioning service provider identifier recorded in the request failure log.

In this implementation, to improve the accuracy of the road identifier, a road that needs to be identified is determined according to the road identifier extracted in the request failure log, and signal blind area marking is then performed on the road for route planning according to the request failure location information, and the network operator identifier and/or the positioning service provider identifier recorded in the request failure log.

In an implementation of this application, the request failure log may further include a request failure log sending time. In this implementation, the step of performing, by using the road identifier as an index, signal blind area marking on the road for route planning according to the request failure location information, and the network operator identifier and/or the positioning service provider identifier recorded in the request failure log may include the following steps:

determining, by using the road identifier as the index, a quantity of first objects passing through a target road corresponding to the road identifier in a preset historical time period;

determining, based on the request failure log sending time, a quantity of second objects passing through the road and sending the request failure log in the preset historical time period;

determining a network communication evaluation value and/or a network positioning evaluation value of the target road according to a ratio of the quantity of the first objects to the quantity of the second objects; and marking a road whose network communication evaluation value and/or network positioning evaluation value are lower than a preset evaluation value as a signal blind area.

To characterize a latest state of the road, particularly road state data that affects subsequent route planning, in this implementation, a network communication situation and a network positioning situation of the corresponding road, namely, the road network communication evaluation value and the network positioning evaluation value, are determined according to the request failure log fed back by the client device.

For example, when the network communication evaluation value and the network positioning evaluation value of the road are calculated:

First, the quantity of the first objects passing through the target road corresponding to the road identifier in the preset historical time period is determined by using the road identifier as the index. The preset historical time period may be set according to requirements for an actual application, for example, may be set to one day or one week. The first quantity of the first objects refers to a total quantity of objects passing through the road in the preset historical time period, and the objects refer to sample objects for determining a network communication evaluation value and a network positioning evaluation value of a road. The objects may be, for example, vehicles, and certainly, may be also pedestrians, bicycles, or other observable and countable objects in other application scenarios.

Then, the quantity of the second objects passing through the road and sending the request failure log in the preset historical time period is determined based on the request failure log sending time. The quantity of the second objects refers to a quantity of objects passing through the road and whose network usage request or positioning request fails in the preset historical time period. Apparently, the quantity of the second objects is less than or equal to the quantity of the first objects, and the quantity of the second objects may be obtained by counting a quantity of request failure logs whose sending times fall in the preset historical time period.

Then, a ratio of which request failure events occur on the target road in the preset historical time period may be obtained by dividing the quantity of the second objects by the quantity of the first objects, and the network communication evaluation value and/or the network positioning evaluation value of the target road may be determined based on the ratio. For example, one or more ratio thresholds may be preset, and different ratio threshold intervals correspond to different network communication/network positioning evaluation values. Compared the calculated ratio of which the request failure events occur on the target road with the ratio thresholds, the calculated ratio falls in a ratio threshold interval, which means that the network communication/network positioning evaluation value of the road is set as a network communication/network positioning evaluation value corresponding to the ratio threshold interval.

Finally, the road whose network communication evaluation value and/or network positioning evaluation value are lower than the preset evaluation value is marked as the signal blind area.

In another implementation of this application, signal blind area marking is directly performed on the road for route planning according to the request failure log. That is, in this implementation, the step of performing, by using the road identifier as an index, signal blind area marking on the road for route planning according to the request failure location information, and the network operator identifier and/or the positioning service provider identifier recorded in the request failure log may include the following steps:

determining, by using the road identifier as the index based on the request failure log sending time, a quantity of third objects passing through a target road corresponding to the road identifier and sending the request failure log in a preset historical time period; and marking the target road as a signal blind area in a case that the quantity of the third objects exceeds a preset quantity threshold.

In this implementation, the quantity of the third objects passing through the target road corresponding to the road identifier and sending the request failure log in the preset historical time period is determined according to the request failure log sending time. Then, compared the quantity of the third objects with the preset quantity threshold, if the quantity of the third objects exceeds the preset quantity threshold, the target road may be marked as the signal blind area.

In an implementation of this application, the method may further include: using the network communication evaluation value and/or the network positioning evaluation value, the request failure location information, and the network operator identifier and/or the positioning service provider identifier of the road as additional mark information of the signal blind area.

To more comprehensively characterize a state of the road to provide data support for an identifier of the state of the road, in this implementation, after the target road is marked with the signal blind area, the network communication evaluation value and/or the network positioning evaluation value, the request failure location information, and the network operator identifier and/or the positioning service provider identifier of the road may be further used as the additional mark information of the signal blind area.

In an implementation of this application, the method may further include the following steps:

determining a geographic location area of a signal blind area based on coverage data of a network access device;

obtaining, from the road network data, a road that falls in the geographic location area of the signal blind area; and setting a network communication evaluation value and/or a network positioning evaluation value of the road located in the geographic location area of the signal blind area as preset values, and performing signal blind area marking on a road for route planning according to the network communication evaluation value and/or the network positioning evaluation value.

Considering that the request failure log may be missing due to a data transmission failure, being in an initialization stage, and other reasons, to ensure the normal progress of route planning, in this implementation, the network communication evaluation value and/or the network positioning evaluation value of the target road are obtained based on the coverage data of the network access device such as a base station or a service station. For example, the geographic location area of the signal blind area is first determined based on the coverage data of the obtained network access device, where the geographic location area of the signal blind area refers to a geographic location area which a communication signal or positioning signal cannot reach. Then, the road that falls in the geographic location area of the signal blind area is obtained from the road network data. The road that falls in the geographic location area of the signal blind area may be considered as a road on which there is a communication network and/or positioning network usage failure, that is, an object traveling on the road located in the geographic location area of the signal blind area is likely to have a route planning request failure event. Then, the network communication evaluation value and/or the network positioning evaluation value of the road located in the geographic location area of the signal blind area are set as the preset values, and signal blind area marking is performed on the corresponding road for route planning based on the network communication evaluation value and/or the network positioning evaluation value. The preset values may be values that are preset and can characterize a network communication state and/or a network positioning state of the road located in the geographic location area of the signal blind area, such as zero, weak, no signal, and extremely weak.

Technical terms and technical features of the implementations shown in and related to FIG. 2 are the same as or similar to technical terms and technical features of the implementations shown in and related to FIG. 1. For explanations and descriptions of the technical terms and technical features of the implementations shown in and related to FIG. 2, reference may be made to the above explanations and explanations of the implementations shown in and related to FIG. 1. Details are not described herein again.

Figure 3:
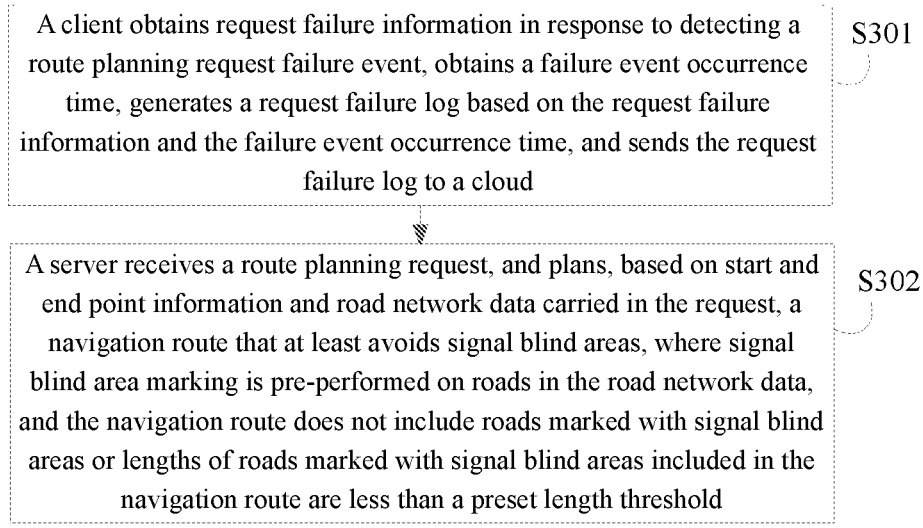
FIG. 3 is a flowchart of a route planning method according to still another implementation of this application.

FIG. 3 is a flowchart of a route planning method according to still another implementation of this application. As shown in FIG. 3, the route planning method includes the following steps S301 and S302.

In step S301, obtaining, by a client, request failure information in response to detecting a route planning request failure event, obtaining a failure event occurrence time, generating a request failure log based on the request failure information and the failure event occurrence time, and sending the request failure log to a cloud.

In step S302, receiving, by a server, a route planning request, and planning, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

As mentioned above, with the development and progress of society, there are more and more vehicles on roads, and many users use application software that supports a map navigation function, to obtain navigation routes and travel along the navigation routes. When application software provides a navigation service, the application software needs to perform data interaction with a cloud through a network, and a terminal device on which the application software is installed needs to be always connected to the network in some scenarios, which also provides new challenges and requirements for navigation route planning.

In consideration of the above problems, in this implementation, a route planning method is provided. The method enables, based on reporting of a client for a route planning request failure log, an application deployed in a cloud to perform signal blind area marking on a road for route planning based on the request failure log. The technical solutions can identify a road in a signal blind area, to provide a planned route with covered communication and a more stable positioning network state, which meets the requirement that a terminal device needs to be always connected to a network during traveling in some scenarios.

In an implementation of this application, the route planning method is applicable to a system which can perform route planning and includes a client device and a server device.

Technical terms and technical features of the implementations shown in and related to FIG. 3 are the same as or similar to technical terms and technical features of the implementations shown in and related to FIG. 1 and FIG. 2. For explanations and descriptions of the technical terms and technical features of the implementations shown in and related to FIG. 3, reference may be made to the above explanations and explanations of the implementations shown in and related to FIG. 1 and FIG. 2. Details are not described herein again.

The following is an apparatus embodiment of this application, which can be used to perform the method embodiments of this application.

FIG. 4 is a structural block diagram of a route planning apparatus according to an implementation of this application. The apparatus may be implemented as all or a part of an electronic device by using software, hardware, or a combination thereof. As shown in FIG. 4, the route planning apparatus includes:

an obtaining module 401, configured to obtain request failure information in response to detecting a route planning request failure event;

a generation module 402, configured to obtain a failure event occurrence time, and generate a request failure log based on the request failure information and the failure event occurrence time; and a sending module 403, configured to send the request failure log to a cloud, to cause an application deployed in the cloud to perform signal blind area marking on a road for route planning based on the request failure log.

As mentioned above, with the development and progress of society, there are more and more vehicles on roads, and many users use application software that supports a map navigation function, to obtain navigation routes and travel along the navigation routes. When application software provides a navigation service, the application software needs to perform data interaction with a cloud through a network, and a terminal device on which the application software is installed needs to be always connected to the network in some scenarios, which also brings new challenges and requirements for navigation route planning.

In consideration of the above problems, in this implementation, a route planning apparatus is provided. The apparatus enables, based on reporting of a client for a route planning request failure log, an application deployed in a cloud to perform signal blind area marking on a road for route planning based on the request failure log. The technical solutions can identify a road in a signal blind area, to provide a planned route with covered communication and a more stable positioning network state, which meets the requirement that a terminal device needs to be always connected to a network during traveling in some scenarios.

In an implementation of this application, the route planning apparatus may be implemented as a client device such as a computer, a computing device, or an electronic device.

In an implementation of this application, the route planning request failure event refers to an event that a user or a client device sends a route planning request but the request fails. The route planning request failure event may include one or more of the following events: a network usage request failure event, or a positioning request failure event. The network usage request failure event refers to an event of requesting to use a network but failed, and the requesting to use a network may refer to, for example, requesting to use network data, requesting to connect the network, requesting to upload data to the network, or requesting to download data from the network. The positioning request failure event refers to an event of requesting location information but failed. The occurrence of the request failure event is caused to a large extent because a communication or positioning network does not cover a current area, a communication or positioning signal is too weak, or a base station or an operator that provides a communication network service or a service provider that provides a location information service fails.

In an implementation of this application, the request failure information refers to information related to the route planning request failure event for recording specific feature information of the corresponding route planning request failure event. For example, in a case that the route planning request failure event is the network usage request failure event, the request failure information may include one or more of the following information: a road identifier, request failure location information, or a network operator identifier. In a case that the route planning request failure event is the positioning request failure event, the request failure information may include one or more of the following information: a road identifier, request failure location information, or a positioning service provider identifier. The road identifier refers to information used for performing distinguishing identification on a road, and the road identifier may be, for example, a road ID. The request failure location information refers to location information of the client device when detecting the route planning request failure event, and the request failure location information may be, for example, longitude and latitude data of the client device when detecting the route planning request failure event. The network operator identifier refers to information used for performing distinguishing identification on a network operator, for example, identification information representing different network operators. The network operators may be, for example, China Mobile, Unicom, and Telecom. The positioning service provider identifier refers to information used for performing distinguishing identification on a positioning service provider, for example, identification information representing different positioning service providers. The positioning service providers may be, for example, GPS, and Beidou.

In an implementation of this application, the failure event occurrence time refers to a time at which the route planning request failure event occurs. Because the client device generates and sends the request failure log after the route planning request failure event is detected, the failure event occurrence time may be also considered as a generating and sending time of the request failure log, and a server may subsequently perform corresponding marking on a road based on the time information.

In the above implementation, after the route planning request failure event is detected, the client device may obtain the request failure information which is related to the route planning request failure event and can characterize the specific feature information of the route planning request failure event; generate the request failure log based on the request failure information and the failure event occurrence time, for example, may encapsulate the request failure information and the failure event occurrence time based on a preset encapsulation protocol, to obtain the request failure log; and send the request failure log to the cloud, to cause the application deployed in the cloud to perform signal blind area marking on the road for route planning based on the request failure log, thereby providing a planned route with covered communication and a more stable positioning network state.

In an implementation of this application, the sending module 403 may be configured to send the request failure log to the cloud in response to detecting a network usage request success event.

As mentioned above, the client device may generate the corresponding request failure log when the route planning request failure occurs. Therefore, when the request failure log is sent to the cloud, the client device needs to be successfully connected to a network before sending, that is, after the network usage request success event is detected, the request failure log is sent to the cloud.

FIG. 5 is a structural block diagram of a route planning apparatus according to another implementation of this application. The apparatus may be implemented as all or a part of an electronic device by using software, hardware, or a combination thereof. As shown in FIG. 5, the route planning apparatus includes:

a receiving module 501, configured to receive a route planning request; and a planning module 502, configured to plan, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

As mentioned above, with the development and progress of society, there are more and more vehicles on roads, and many users use application software that supports a map navigation function, to obtain navigation routes and travel along the navigation routes. When application software provides a navigation service, the application software needs to perform data interaction with a cloud through a network, and a terminal device on which the application software is installed needs to be always connected to the network in some scenarios, which also brings new challenges and requirements for navigation route planning.

In consideration of the above problems, in this implementation, a route planning apparatus is provided. The apparatus performs navigation route planning by using road network data on which signal blind area marking is pre-performed and start and end point information carried in a route planning request. The technical solutions can identify a road in a signal blind area, to provide a planned route with covered communication and a more stable positioning network state, which meets the requirement that a terminal device needs to be always connected to a network during traveling in some scenarios.

In an implementation of this application, the route planning apparatus may be implemented as a server side device such as a computer, a computing device, an electronic device, a server, or a server cluster that can perform route planning.

In an implementation of this application, the route planning request refers to a request sent by a client for requesting to perform route planning, where the route planning request may carry the start and end point information of route planning.

In an implementation of this application, signal blind area marking is pre-performed on the roads in the road network data according to a request failure log, where the request failure log is sent by a client device, and may include request failure information and an occurrence time of a route planning request failure event, and the occurrence time of the route planning request failure event may be also considered as a sum of request failure log sending times. In a case that the route planning request failure event is a network usage request failure event, the request failure information may include one or more of the following information: a road identifier, request failure location information, or a network operator identifier. In a case that the route planning request failure event is a positioning request failure event, the request failure information may include one or more of the following information: a road identifier, request failure location information, or a positioning service provider identifier.

Route planning performed based on the road network data in which signal blind area marking is performed on the above roads does not include the roads marked with the signal blind areas, or the lengths of the roads marked with the signal blind areas included in a generated navigation route are less than a preset length threshold, where the length threshold may be set according to requirements for an actual application, for example, the length threshold may be determined according to an influence of a road in a signal blind area on the overall travel of the navigation route.

In the above implementation, after a server side device receives the route planning request sent by the client device, the server side device may plan the navigation route according to the start and end point information carried in the route planning request and the road network data in which signal blind area marking is pre-performed on the roads, so that the navigation route can avoid the signal blind areas, for example, the navigation route does not include the roads marked with the signal blind areas, or the lengths of the roads marked with the signal blind areas included in the navigation route are less than the preset length threshold.

In an implementation of this application, the apparatus further includes a determining module, configured to determine, based on a device identifier carried in the request, whether a policy of avoiding signal blind areas during route planning is valid; and plan, if the policy is valid, the navigation route that at least avoids the signal blind areas based on the start and end point information and the road network data carried in the request.

In this implementation, the route planning request carries the device identifier, and the device identifier refers to information for the client device to perform distinguishing identification, such as a device ID or a device serial number. The device identifier may be used for identifying whether the client device needs the policy of avoiding the signal blind areas during route planning. For example, a set of client device identifiers that need the policy of avoiding the signal blind areas during route planning may be predetermined based on authorization of the client device. If the device identifier carried in the received route planning request is located in the set of client device identifiers, it may be considered that the client device determines to need the policy of avoiding the signal blind areas during route planning, that is, for the client device, the policy of avoiding the signal blind areas during route planning is valid. After it is determined that the policy of avoiding the signal blind areas during route planning is valid, the navigation route that at least avoids the signal blind areas is planned based on the start and end point information and the road network data carried in the request.

In an implementation of this application, the apparatus further includes a marking module, configured to perform, based on a request failure log received in a set time period, signal blind area marking on a road for route planning.

To avoid a road in a signal blind area during navigation route planning, in this implementation, signal blind area marking needs to be performed on the road for route planning based on the received request failure log. Further, considering that a greater computing pressure may be brought if a frequency of marking whether the road is in the signal blind area is too high, a processing manner of periodically collecting request failure logs, and periodically marking whether the road is in the signal blind area or periodically updating a road identifier may be used. That is, one time interval may be preset, such as one day or one week; received request failure logs are collected every time interval such as every day or every week, to obtain collected request failure logs; and signal blind area marking is performed on the road for route planning according to the collected request failure logs, that is, signal blind area marking is performed on the road for route planning based on the request failure logs received in the set time period. For example, if the time interval is set to one week, the set time period is one week before a current time.

As mentioned above, the request failure log may include request failure information, and the request failure information may include: a road identifier, request failure location information, and a network operator identifier and/or a positioning service provider identifier. Therefore, in an implementation of this application, the marking module may be configured to:

extract the road identifier from the request failure log; and perform, by using the road identifier as an index, signal blind area marking on the road for route planning according to the request failure location information, and the network operator identifier and/or the positioning service provider identifier recorded in the request failure log.

In this implementation, to improve the accuracy of the road identifier, a road that needs to be identified is determined according to the road identifier extracted from the request failure log, and signal blind area marking is then performed on the road for route planning according to the request failure location information, and the network operator identifier and/or the positioning service provider identifier recorded in the request failure log.

In an implementation of this application, the request failure log may further include a request failure log sending time. In this implementation, the part of performing, by using the road identifier as an index, signal blind area marking on the road for route planning according to the request failure location information, and the network operator identifier and/or the positioning service provider identifier recorded in the request failure log may be configured to:

determine, by using the road identifier as the index, a quantity of first objects passing through a target road corresponding to the road identifier in a preset historical time period;

determine, based on the request failure log sending time, a quantity of second objects passing through the road and sending the request failure log in the preset historical time period;

determine a network communication evaluation value and/or a network positioning evaluation value of the target road according to a ratio of the quantity of the first objects to the quantity of the second objects; and mark a road whose network communication evaluation value and/or network positioning evaluation value are lower than a preset evaluation value as a signal blind area.

To characterize a latest state of the road, particularly road state data that affects subsequent route planning, in this implementation, a network communication situation and a network positioning situation of the corresponding road, namely, the road network communication evaluation value and the network positioning evaluation value, are determined according to the request failure log fed back by the client device.

For example, when the network communication evaluation value and the network positioning evaluation value of the road are calculated:

First, the quantity of the first objects passing through the target road corresponding to the road identifier in the preset historical time period is determined by using the road identifier as the index. The preset historical time period may be set according to requirements for an actual application, for example, may be set to one day or one week. The first quantity of the first objects refers to a total quantity of objects passing through the road in the preset historical time period, and the objects refer to sample objects for determining a network communication evaluation value and a network positioning evaluation value of a road. The objects may be, for example, vehicles, and certainly, may be also pedestrians, bicycles, or other observable and countable objects in other application scenarios.

Then, the quantity of the second objects passing through the road and sending the request failure log in the preset historical time period is determined based on the request failure log sending time. The quantity of the second objects refers to a quantity of objects passing through the road and whose network usage request or positioning request fails in the preset historical time period. Apparently, the quantity of the second objects is less than or equal to the quantity of the first objects, and the quantity of the second objects may be obtained by counting a quantity of request failure logs whose sending times fall in the preset historical time period.

Then, a ratio of which request failure events occur on the target road in the preset historical time period may be obtained by dividing the quantity of the second objects by the quantity of the first objects, and the network communication evaluation value and/or the network positioning evaluation value of the target road may be determined based on the ratio. For example, one or more ratio thresholds may be preset, and different ratio threshold intervals correspond to different network communication/network positioning evaluation values. Compared the calculated ratio of which the request failure events occur on the target road with the ratio thresholds, the calculated ratio falls in a ratio threshold interval, which means that the network communication/network positioning evaluation value of the road is set as a network communication/network positioning evaluation value corresponding to the ratio threshold interval.

Finally, the road whose network communication evaluation value and/or network positioning evaluation value are lower than the preset evaluation value is marked as the signal blind area.

In another implementation of this application, signal blind area marking is directly performed on the road for route planning according to the request failure log. That is, in this implementation, the part of performing, by using the road identifier as an index, signal blind area marking on the road for route planning according to the request failure location information, and the network operator identifier and/or the positioning service provider identifier recorded in the request failure log may be configured to:

determine, by using the road identifier as the index based on the request failure log sending time, a quantity of third objects passing through a target road corresponding to the road identifier and sending the request failure log in a preset historical time period; and mark the target road as a signal blind area in a case that the quantity of the third objects exceeds a preset quantity threshold.

In this implementation, the quantity of the third objects passing through the target road corresponding to the road identifier and sending the request failure log in the preset historical time period is determined according to the request failure log sending time. Then, compared the quantity of the third objects with the preset quantity threshold, if the quantity of the third objects exceeds the preset quantity threshold, the target road may be marked as the signal blind area.

In an implementation of this application, the marking module may be further configured to use the network communication evaluation value and/or the network positioning evaluation value, the request failure location information, and the network operator identifier and/or the positioning service provider identifier of the road as additional mark information of the signal blind area.

To more comprehensively characterize a state of the road to provide data support for an identifier of the state of the road, in this implementation, after the target road is marked with the signal blind area, the network communication evaluation value and/or the network positioning evaluation value, the request failure location information, and the network operator identifier and/or the positioning service provider identifier of the road may be further used as the additional mark information of the signal blind area.

In an implementation of this application, the marking module may be further configured to:

determine a geographic location area of a signal blind area based on coverage data of a network access device;

obtain, from the road network data, a road that falls in the geographic location area of the signal blind area; and set a network communication evaluation value and/or a network positioning evaluation value of the road located in the geographic location area of the signal blind area as preset values, and perform signal blind area marking on a road for route planning according to the network communication evaluation value and/or the network positioning evaluation value.

Considering that the request failure log may be missing due to a data transmission failure, being in an initialization stage, and other reasons, to ensure the normal progress of route planning, in this implementation, the network communication evaluation value and/or the network positioning evaluation value of the target road are obtained based on the coverage data of the network access device such as a base station or a service station. For example, the geographic location area of the signal blind area is first determined based on the coverage data of the obtained network access device, where the geographic location area of the signal blind area refers to a geographic location area which a communication signal or positioning signal cannot reach. Then, the road that falls in the geographic location area of the signal blind area is obtained from the road network data. The road that falls in the geographic location area of the signal blind area may be considered as a road on which there is a communication network and/or positioning network usage failure, that is, an object traveling on the road located in the geographic location area of the signal blind area is likely to have a route planning request failure event. Then, the network communication evaluation value and/or the network positioning evaluation value of the road located in the geographic location area of the signal blind area are set as the preset values, and signal blind area marking is performed on the corresponding road for route planning based on the network communication evaluation value and/or the network positioning evaluation value. The preset values may be values that are preset and can characterize a network communication state and/or a network positioning state of the road located in the geographic location area of the signal blind area, such as zero, weak, no signal, and extremely weak.

Technical terms and technical features of the implementations shown in and related to FIG. 5 are the same as or similar to technical terms and technical features of the implementations shown in and related to FIG. 4. For explanations and descriptions of the technical terms and technical features of the implementations shown in and related to FIG. 5, reference may be made to the above explanations and explanations of the implementations shown in and related to FIG. 4. Details are not described herein again.

FIG. 6 is a structural block diagram of a route planning system according to an implementation of this application. The apparatus may be implemented as all or a part of an electronic device by using software, hardware, or a combination thereof. As shown in FIG. 6, the route planning apparatus includes:

a client 601, configured to obtain request failure information in response to detecting a route planning request failure event, obtain a failure event occurrence time, generate a request failure log based on the request failure information and the failure event occurrence time, and send the request failure log to a cloud; and a server 602, configured to receive a route planning request, and plan, based on start and end point information and road network data carried in the request, a navigation route that at least avoids signal blind areas, where signal blind area marking is pre-performed on roads in the road network data, and the navigation route does not include roads marked with signal blind areas or lengths of roads marked with signal blind areas included in the navigation route are less than a preset length threshold.

In an implementation of this application, the route planning system may be implemented as a system which can perform route planning and includes a client device and a server device.

Technical terms and technical features of the implementations shown in and related to FIG. 6 are the same as or similar to technical terms and technical features of the implementations shown in and related to FIG. 4 and FIG. 5. For explanations and descriptions of the technical terms and technical features of the implementations shown in and related to FIG. 6, reference may be made to the above explanations and explanations of the implementations shown in and related to FIG. 4 and FIG. 5. Details are not described herein again.

An embodiment of this application further discloses a navigation service, including: obtaining a route planning result of a navigated object based on the above route planning method, and providing a navigation guidance service of a corresponding scenario for the navigated object based on the route planning result, where the corresponding scenario is one or more combinations of AR navigation, overhead navigation, or main and auxiliary road navigation.

An embodiment of this application further discloses a navigation method, including: obtaining a navigation route at least based on a start point, an end point, and route planning data, and performing navigation guidance based on the navigation route, where the route planning data is implemented based on the method according to any one of the above descriptions.

This application further discloses an electronic device. FIG. 7 is a structural block diagram of an electronic device according to an implementation of this application. As shown in FIG. 7, an electronic device 700 includes a memory 701 and a processor 702, where the memory 701 is configured to store one or more computer instructions, the computer instructions, when executed by the processor 702, implementing the steps of the above method.

FIG. 8 is a schematic structural diagram of a computer system adapted to implement a route planning method according to an implementation of this application.

As shown in FIG. 8, a computer system 800 includes a processing unit 801, which can perform various processing in the above implementations according to a program stored in a read-only memory (ROM) 802 or a program loaded into a random access memory (RAM) 803 from a storage part 808. In the RAM 803, various programs and data that are required for operations of the system 800 are further stored. The processing unit 801, the ROM 802, and the RAM 803 are connected to each other through a bus 804. An input/output (I/O) interface 805 is also connected to the bus 804.

The following components are connected to the I/O interface 805 includes: an input part 806 including a keyboard, a mouse, or the like; an output part 807 including a cathode ray tube (CRT), a liquid crystal display (LCD), a speaker, and the like; a storage part 808 including hard disk, and the like; and a communication part 809 including a network interface card such as an LAN card, a modem, and the like. The communication part 809 performs communication processing by using a network such as the Internet. A driver 810 is also connected to the I/O interface 805 as required. A removable medium 811, such as a magnetic disk, an optical disc, a magneto-optical disk, or a semiconductor memory, is installed on the driver 810 as required, so that a computer program read from the removable medium is installed into the storage part 808 as required. The processing unit 801 may be implemented as a processing unit such as a CPU, GPU, TPU, FPGA, NPU, or the like.

In particular, according to the implementations of this application, the method described above may be implemented as a computer software program. For example, an implementation of this application includes a computer program product, including a computer program visibly contained on a readable medium thereof. The computer program includes program code for performing the route planning method. In such an implementation, by using the communication part 809, the computer program may be downloaded and installed from a network, and/or installed from the removable medium 811.

Flowcharts and block diagrams in the drawings illustrate architectures, functions, and operations that may be implemented by using the system, the method, and the computer program product according to the various implementations of this application. In this regard, each block in the flowchart or the block diagram may represent a module, a program segment, or a part of code. The module, the program segment, or the part of the code includes one or more executable instructions for implementing a specified logical function. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should be also noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

Related units or modules described in the implementations of this application may be implemented in a software manner, or may be implemented in a hardware manner. The units or modules described or a module may be also set in a processor. Names of the units or modules do not constitute a limitation on the units or modules in a specific case.

In another aspect, an embodiment of this application further provides a non-transitory computer-readable storage medium. The computer-readable storage medium may be the computer-readable storage medium included in the apparatus described in the above implementation, or may be a computer-readable storage medium that exists independently and that is not assembled in a device. The computer-readable storage medium stores one or more programs, the computer programs, when executed by one or more processors, implementing the method according to the embodiments of this application.

The foregoing descriptions are merely preferred embodiments of this application and descriptions of the technical principles used. A person skilled in the art should understand that the scope of the embodiments of this application is not limited to the technical solutions formed by the foregoing particular combinations of technical features, but shall also encompass other technical solutions formed by arbitrarily combining the foregoing technical features or equivalent features thereof without departing from the on the inventive concept. For example, technical solutions formed by replacing the foregoing features with technical features having similar functions disclosed in the embodiments of this application (but not limited thereto) are also included.

What is claimed is:

1. A route planning method implemented by a computer system, comprising:
   obtaining request failure information in response to detecting a route planning request failure event;
   extracting, from the request failure information, a road identifier and a failure event occurrence time;
   determining, by using the road identifier as an index, a quantity of first objects passing through the road corresponding to the road identifier in a preset historical time period;
   determining, based on the failure event occurrence time, a quantity of second objects passing through the road and sending the request failure log in the preset historical time period;
   determining a network communication evaluation value and/or a network positioning evaluation value of the road according to a ratio of the quantity of the first objects to the quantity of the second objects; and
   marking, based on the network communication evaluation value and/or network positioning evaluation value, the road as a signal blind area where communication or positioning signals are not present, too weak, or unreliable due to network issues.

2. The method according to claim 1, wherein the route planning request failure event comprises a network usage request failure event, and the request failure information further comprises one or more of the following information: request failure location information, or a network operator identifier, a positioning request failure event, or a positioning service provider identifier.

3. A route planning method, comprising:
   receiving a route planning request; and
   planning, based on start and end point information and road network data carried in the request, a navigation route that avoids signal blind areas, wherein signal blind area marking is pre-performed on roads in the road network data, and the navigation route does not include roads marked with signal blind areas or lengths of roads marked with signal blind areas included in the navigation route are less than a preset length threshold,
   wherein the signal blind area marking comprises:
   extracting, from a request failure log corresponding to a route planning request failure event, a road identifier and a request failure log sending time;
   determining, by using the road identifier as an index, a quantity of first objects pas sing through the road corresponding to the road identifier in a preset historical time period;
   determining, based on the request failure log sending time, a quantity of second objects passing through the road and sending the request failure log in the preset historical time period;
   determining a network communication evaluation value and/or a network positioning evaluation value of the road according to a ratio of the quantity of the first objects to the quantity of the second objects; and
   marking, based on the network communication evaluation value and/or network positioning evaluation value, the road as a signal blind area where communication or positioning signals are not present, too weak, or unreliable due to network issues.

4. The method according to claim 3, further comprising:
   determining, based on a device identifier carried in the route planning request, whether a policy of avoiding signal blind areas during route planning is valid; and
   performing, if the policy is valid, the step of planning, based on the start and end point information and the road network data carried in the route planning request, a navigation route that avoids signal blind areas.

5. The method according to claim 3, further comprising:
   determining a geographic location area of the signal blind area;
   obtaining, from the road network data, a target road that falls in the geographic location area of the signal blind area; and
   setting the network communication evaluation value and/or the network positioning evaluation value of the target road located in the geographic location area of the signal blind area as preset values, and performing signal blind area marking on the target road for route planning according to the network communication evaluation value and/or the network positioning evaluation value.

6. The method according to claim 3, wherein the request failure log further comprises request failure location information, and a network operator identifier and/or a positioning service provider identifier.

7. The method according to claim 6, wherein the signal blind area marking further comprises:
   performing, by using the road identifier as the index, signal blind area marking on the road for route planning according to the request failure location information, and the network operator identifier and/or the positioning service provider identifier recorded in the request failure log.

8. The method according to claim 6, further comprising:
   using the network communication evaluation value and/or the network positioning evaluation value, the request failure location information, and the network operator identifier and/or the positioning service provider identifier of the road as additional mark information of the signal blind area.

9. The method according to claim 7, wherein the signal blind area marking further comprises:
   determining, by using the road identifier as the index based on the request failure log sending time, a quantity of third objects passing through the road corresponding to the road identifier and sending the request failure log in the preset historical time period; and
   marking the road as the signal blind area if the quantity of the third objects exceeds a preset quantity threshold.

10. A non-transitory computer-readable storage medium storing instructions that, when executed by one or more processors, cause the one or more processors to perform operations comprising:
    receiving a route planning request; and
    planning, based on start and end point information and road network data carried in the request, a navigation route that avoids signal blind areas, wherein signal blind area marking is pre-performed on roads in the road network data, and the navigation route does not include roads marked with signal blind areas or lengths of roads marked with signal blind areas included in the navigation route are less than a preset length threshold,
    wherein the signal blind area marking comprises:
    extracting, from a request failure log corresponding to a route planning request failure event, a road identifier and a request failure log sending time;
    determining, by using the road identifier as an index, a quantity of first objects passing through the road corresponding to the road identifier in a preset historical time period;

determining, based on the request failure log sending time, a quantity of second objects passing through the road and sending the request failure log in the preset historical time period;

determining a network communication evaluation value and/or a network positioning evaluation value of the road according to a ratio of the quantity of the first objects to the quantity of the second objects; and marking, based on the network communication evaluation value and/or network positioning evaluation value, the road as a signal blind area where communication or positioning signals are not present, weak, or unreliable due to network issues.

11. The non-transitory computer-readable storage medium of claim 10, wherein the operations further comprise:

determining, based on a device identifier carried in the route planning request, whether a policy of avoiding signal blind areas during route planning is valid; and performing, if the policy is valid, the step of planning, based on the start and end point information and the road network data carried in the route planning request, a navigation route that avoids signal blind areas.

12. The non-transitory computer-readable storage medium of claim 10, wherein the operations further comprise:

determining a geographic location area of the signal blind area;

obtaining, from the road network data, a target road that falls in the geographic location area of the signal blind area; and setting the network communication evaluation value and/or the network positioning evaluation value of the target road located in the geographic location area of the signal blind area as preset values, and performing signal blind area marking on the target road for route planning according to the network communication evaluation value and/or the network positioning evaluation value.

13. The non-transitory computer-readable storage medium of claim 10, wherein the request failure log further comprises request failure location information, and a network operator identifier and/or a positioning service provider identifier.

14. The non-transitory computer-readable storage medium of claim 13, wherein the signal blind area marking further comprises:

performing, by using the road identifier as the index, signal blind area marking on the road for route planning according to the request failure location information, and the network operator identifier and/or the positioning service provider identifier recorded in the request failure log.

15. The non-transitory computer-readable storage medium of claim 13, wherein the operations further comprise:

using the network communication evaluation value and/or the network positioning evaluation value, the request failure location information, and the network operator identifier and/or the positioning service provider identifier of the road as additional mark information of the signal blind area.

16. The non-transitory computer-readable storage medium of claim 10, wherein the signal blind area marking further comprises:

determining, by using the road identifier as the index based on the request failure log sending time, a quantity of third objects passing through the road corresponding to the road identifier and sending the request failure log in the preset historical time period; and marking the road as the signal blind area if the quantity of the third objects exceeds a preset quantity threshold.

* * * * *